No. 741,399. PATENTED OCT. 13, 1903.
J. GUIMARÃES.
MAGAZINE PHOTOGRAPHIC CAMERA.
APPLICATION FILED JUNE 4, 1903.
NO MODEL. 3 SHEETS—SHEET 1.

No. 741,399. PATENTED OCT. 13, 1903.
J. GUIMARÃES.
MAGAZINE PHOTOGRAPHIC CAMERA.
APPLICATION FILED JUNE 4, 1903.
NO MODEL. 3 SHEETS—SHEET 2.

No. 741,399. Patented October 13, 1903.

UNITED STATES PATENT OFFICE.

JULIO GUIMARÃES, OF HAMBURG, GERMANY.

MAGAZINE PHOTOGRAPHIC CAMERA.

SPECIFICATION forming part of Letters Patent No. 741,399, dated October 13, 1903.

Application filed June 4, 1903. Serial No. 160,012. (No model.)

*To all whom it may concern:*

Be it known that I, JULIO GUIMARÃES, a citizen of Argentina, and a resident of Hamburg, Germany, have invented certain new and useful Improvements in Magazine Photographic Cameras; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My invention relates to apparatus by means of which it is possible with the use of the same number of plates as in other apparatus to take twice, four times, six times, &c., the number of photographic pictures, so that it is possible to increase the number of photographs very considerably.

Figure 1:
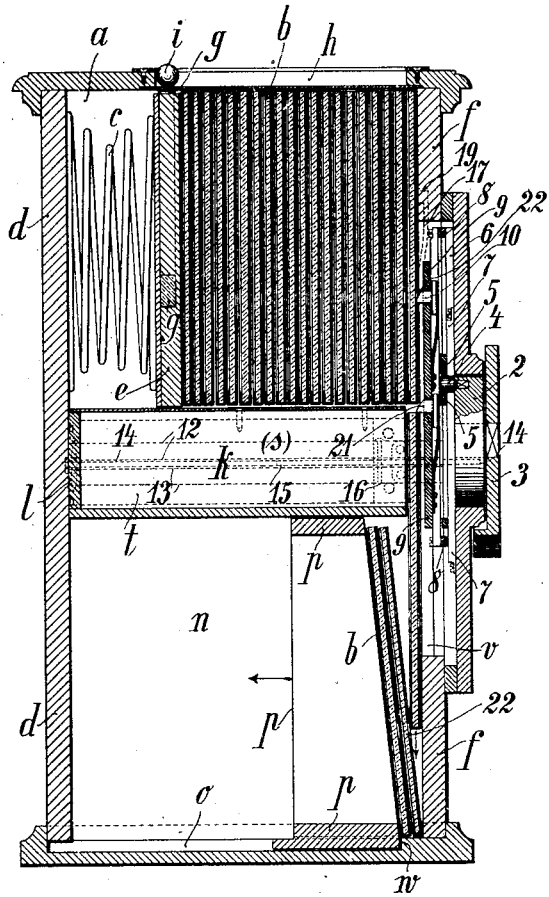
Figure 2:
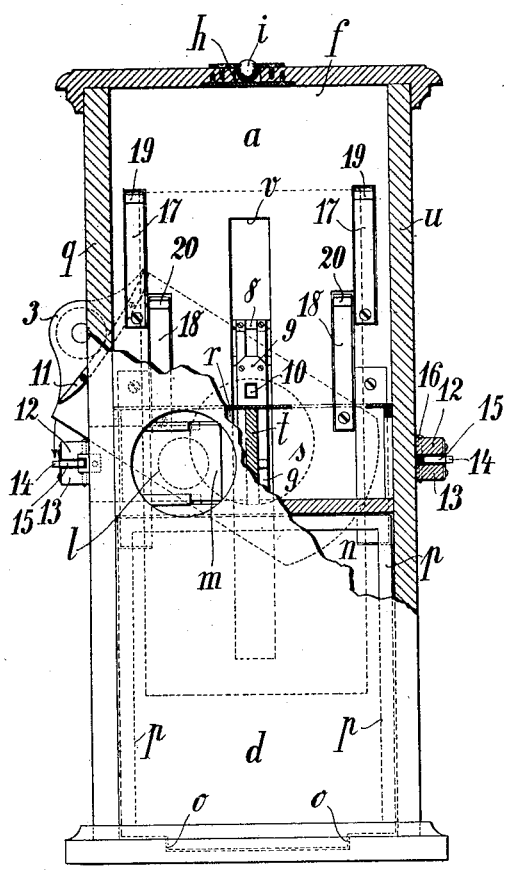
Figure 3:
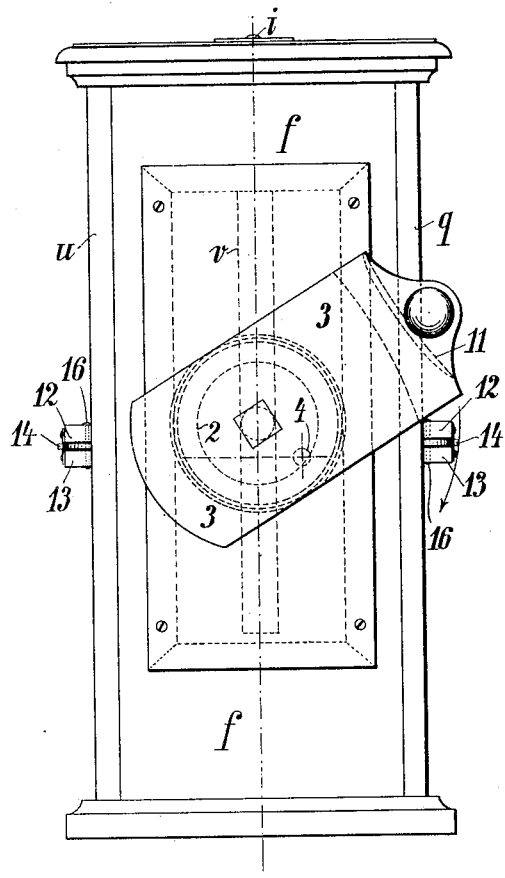
Figure 4:
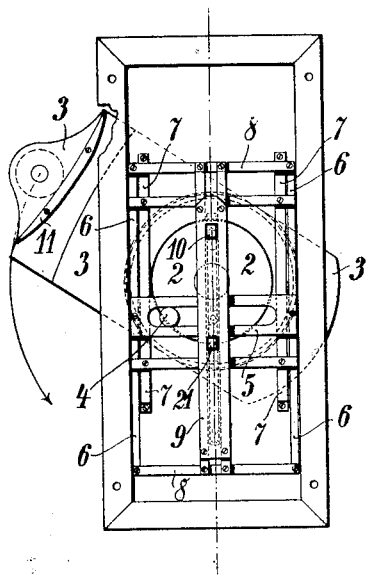
Figure 5:
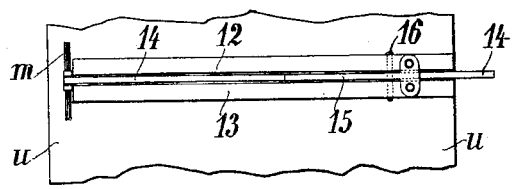

In the drawings, Figure 1 is a vertical transverse section of the apparatus. Fig. 2 is a front elevation of the same, partly in section, showing the crank in another position. Fig. 3 is a rear elevation of Fig. 2. Figs. 4 and 5 illustrate details.

The apparatus comprises three chambers, the upper or top one $a$ of which contains the photographic plates $b$, which are constantly pressed against the wall $f$ by means of a spring $c$, arranged between the wall $d$ and a movable partition $e$. This partition $e$ is provided with a magnet $g$, which attracts a small iron ball $i$ along a groove $h$, so that the position of this ball will always indicate the position of the partition $e$, from which the number of the photographic plates which are still unexposed may be deduced. The finders may be provided at any desired place and are not shown, as they are not material to this invention. The usual parts necessary for the taking of photographs are provided in the central chamber $k$. In the constructional example shown two complete cameras $r$ and $s$ are employed, separated from each other by the intermediate piece $t$, and each of which is provided with the necessary parts, such as the lenses $l$, which in this arrangement are shown by way of example as being of the most simple construction and the shutters $m$. Other parts, such as screens and the like, are not shown at all, because they are not material to this invention. The lower or bottom chamber $n$ receives the plates after they have been wholly exposed. It contains an inclined frame $p$, which is capable of moving in a guide $o$ and which serves as a rest for the plates as they slide down. This frame moves under the pressure of the plates as they fall one after another down into the lower chamber $n$ to such an extent that the lower chamber is capable of receiving just as many plates as the upper chamber.

On the wall $f$ of the apparatus opposite to the lenses there is arranged the special arrangement which constitutes the essence of this invention and which is capable of moving up and down in a wide longitudinal slot $v$ in the said wall $f$. An eccentric 2, which is set in motion by means of a flat crank 3, has a pin 4 sliding in a slotted part 5, the extreme ends of which are screwed firmly to a frame 6, adapted to move in guides 7. This frame 6 has fixed to its cross-pieces 8 a central bar 9, which is provided with spring projections 10 21. The flat crank is provided with a guiding-fillet 11 on the side which faces the apparatus. On each of the side walls $q$ $u$ two fillets 12 and 13 are provided, between which a lever 14 is mounted that is held by a spring 15 in such a position that the shutters $m$, movably jointed to the said lever, are closed. The levers are capable of movement on axes of rotation 16. On the inner side of the wall $f$ are springs 17 and 18, provided with shoulders 19 and 20.

The operation of the apparatus is as follows: The upper chamber is first filled with plates, the rearmost plate being pressed against the wall $f$. When the crank 3 is moved in the direction of the arrow, a twofold effect is produced: the eccentric is rotated, and by the engagement of its pin with the slotted link it moves the frame 6, and consequently also the central bar 9, to and fro. Further, the flat crank in its rotation engages the projecting end of one of the levers 14 by means of the guiding-fillet 11, and by its further movement, overcoming the force of the spring 15, it produces an instantaneous exposure—that is to say, it causes the shutter $m$ to be moved away from the lens $l$. By this means the first picture is produced on the lower third of the photographic plate. If the crank be moved further by the operator, the guiding-fillet 11 reaches the other side of the apparatus, where it engages with the lever 14 on that side, and thus produces a second instantaneous exposure—i. e., a second picture on the lower third of the plate in the second chamber. Corresponding exposures by operating the two respective shutters are given to the middle third of the photographic plate by the further rotation of the crank after this middle third has been brought into the middle chamber $k$ by means of the projection 10, which forces the plate down into the space 22. The plate is prevented from slipping upward by means of the springs 17, provided with the shoulders 19. After this middle third of the plate has been exposed by the opening of the shutters by means of the continued rotation of the crank the projection 21 moves the plate so as to bring the last—i. e., the upper—third of the latter within the central chamber $k$. The plate is prevented from slipping out of the chamber by means of springs 18, with shoulders 20. Each third of the plate remains in position during the two instantaneous exposures by reason of the circumstance that the central bar is moved to and fro during each revolution of the crank and in its return movement its projections do not exert any action on the plate. This is due to the fact that the projections are pressed into the bar by the plate, and it is only after the expiration of a complete to-and-fro movement that first the projection 10 and then for the last third that the projection 21 is able to spring out and engage the plate. When the last third of the plate has been exposed, the plate drops into the space 22 in the bottom chamber $n$, where it rests against the inclined frame $p$. As the following plates drop into this chamber they are caused by the inclination of the frame to force the latter away from the wall, so that the plates stack themselves one behind the other until the bottom chamber is filled with the plates from the top chamber.

The frame $p$ is kept, by means of a stop $w$, in a position to allow the first plate to drop into the space 22 in the bottom chamber.

Having thus described my invention, what I claim as new therein, and desire to secure by Letters Patent of the United States of America, is—

1. A photographic camera, consisting of means for storing sensitized plates, a camera proper, devices for feeding each plate a portion at a time into the camera proper, means for exposing the plate at its portions within the camera proper, and a crank connected with said feeding means and with said exposing means, substantially as set forth.

2. In a photographic apparatus, the combination, with means for storing sensitized plates, of a camera proper, devices for feeding each plate a portion at a time into the camera proper, said means comprising a central vertically-movable bar provided with spring projections, and an eccentric connected with said bar, means for exposing a plate at its portions within the camera proper, and a crank connected with said eccentric and adapted to engage and operate said exposing means, substantially as set forth.

3. In a photographic camera, the combination of means for storing sensitized plates, a camera proper, a receptacle for the exposed plates, means for feeding successively each plate a portion at a time into the camera proper, and from the camera proper into the receptacle, means for exposing the fed portion, and an operating-crank connected with said feeding means and adapted to operate said exposing means on the same movement, substantially as set forth.

In testimony that I claim the foregoing as my invention I have signed my name in presence of two subscribing witnesses.

JULIO GUIMARÃES.

Witnesses:
E. H. L. MUMMENHOFF,
OTTO W. HELLMRICH.